Jan. 5, 1971   F. C. CARROLL   3,552,844
OPTICAL WEIGHING SCALE
Filed Feb. 23, 1968   4 Sheets-Sheet 3

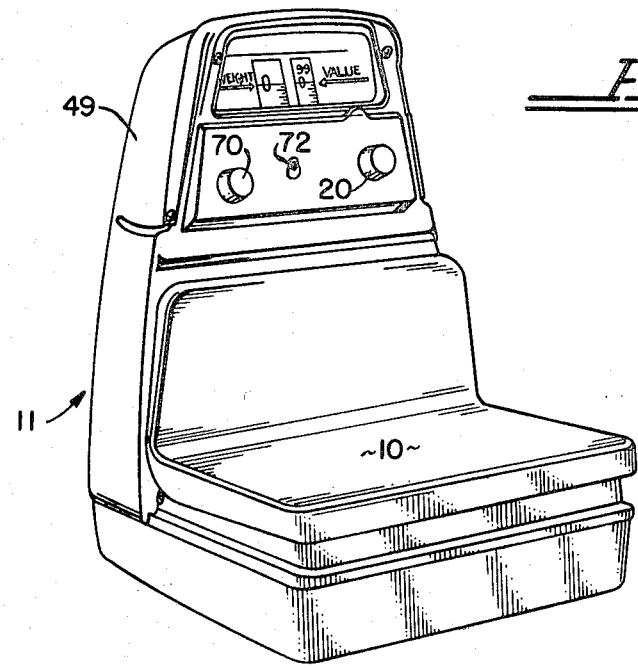
Fig_1
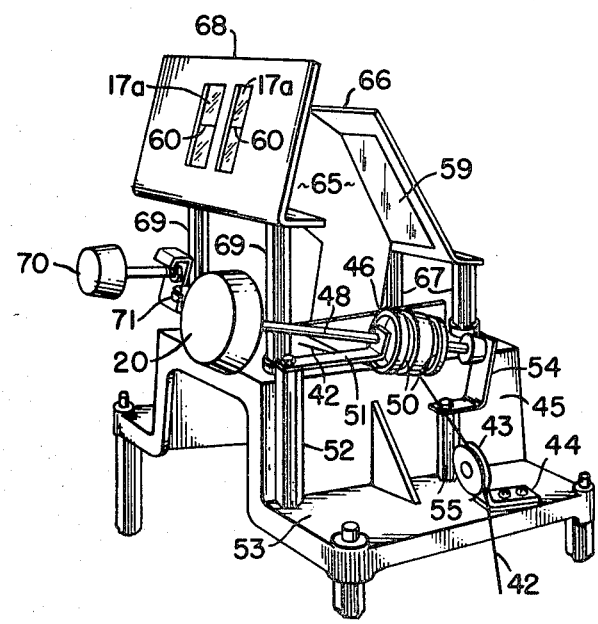
Fig_2

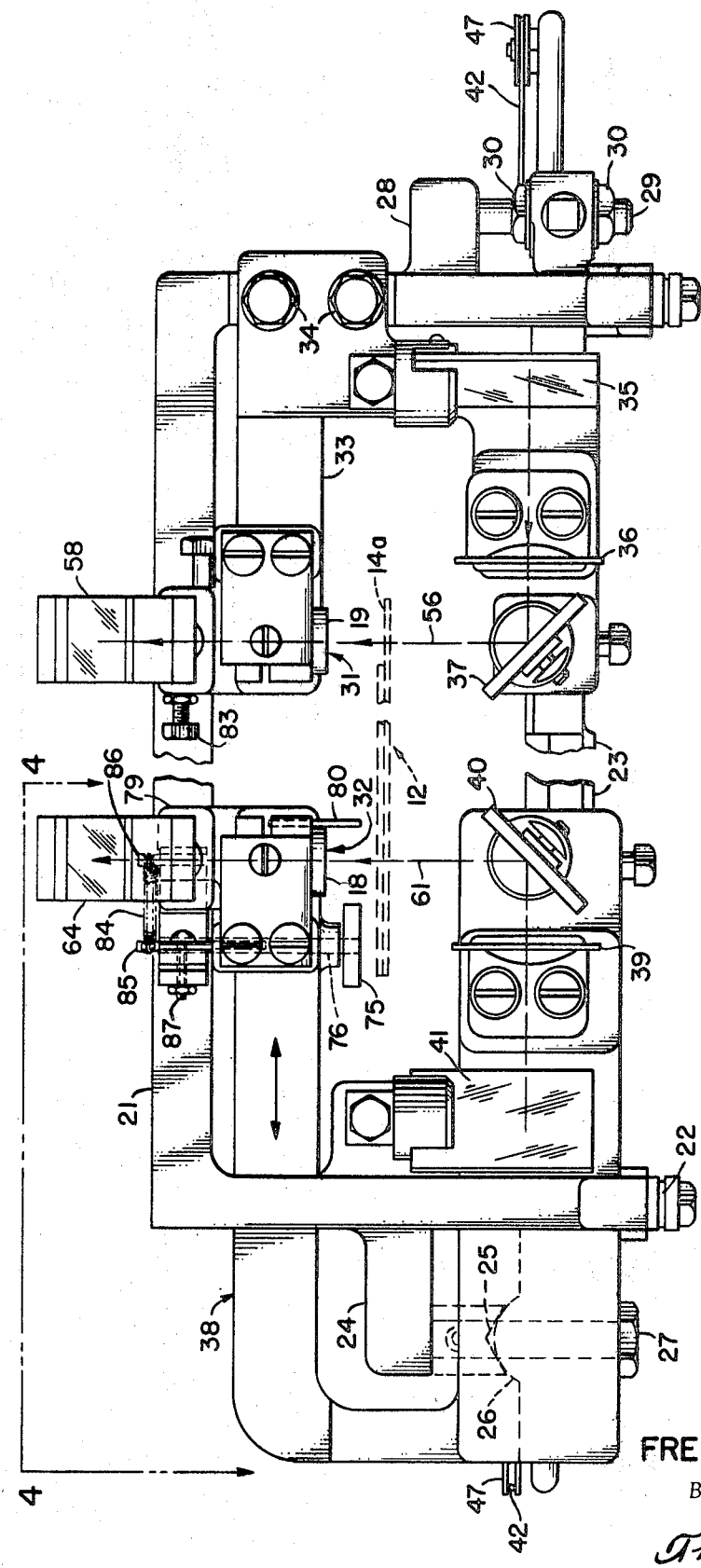

INVENTOR.
FREDERICK C. CARROLL
BY
Thomas H. Grafton
ATTORNEY

Jan. 5, 1971  F. C. CARROLL  3,552,844
OPTICAL WEIGHING SCALE
Filed Feb. 23, 1968  4 Sheets-Sheet 4
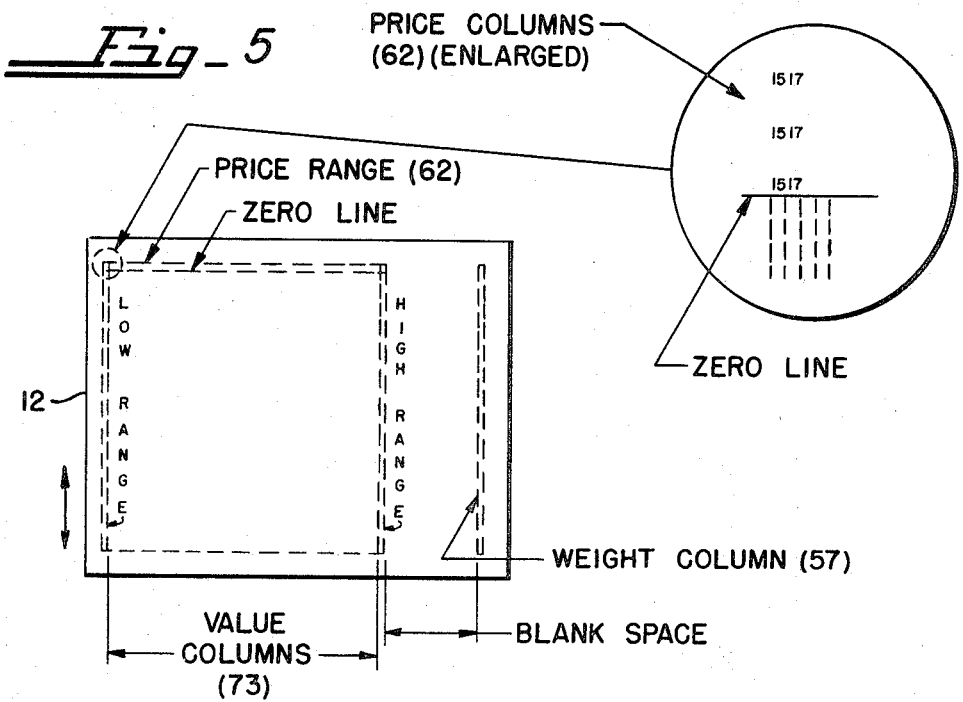
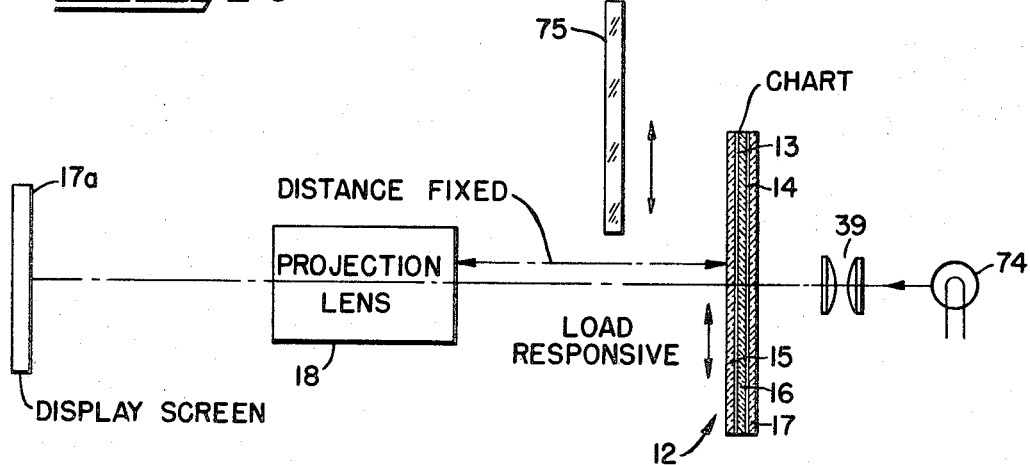
INVENTOR.
FREDERICK C. CARROLL
BY
Thomas H. Grafton
ATTORNEY 3,552,844
OPTICAL WEIGHING SCALE
Frederick C. Carroll, Toledo, Ohio, assignor to The Reliance Electric and Engineering Company, Toledo, Ohio, a corporation of Ohio
Filed Feb. 23, 1968, Ser. No. 707,506
Int. Cl. G01g *23/32;* G03b *21/00, 3/00, 21/28*
U.S. Cl. 353—41                8 Claims

ABSTRACT OF THE DISCLOSURE

A projection system in a weighing scale. The weighing scale includes a display screen and means for projecting images onto the screen including a load-responsive chart having successive series of indicia on a plurality of surfaces arranged in spaced relation from each other, a carriage movable along the chart, and lens means. The lens means includes a projection lens carried by the carriage for projecting images of indicia from each of the series onto the screen. The projection lens has a fixed distance from the chart and is focused on one of the indicia surfaces. The lens means also includes a focal length changing means insertable or removable in the optical path between the projection lens and the chart for changing the effective optical path length to focus the projection lens on only one of the indicia surfaces at any one time and, thus, for accomplishing the focusing.

---

This invention relates to projected indication weighing scales and is an improvement on the device disclosed in U.S. application Ser. No. 651,235, filed July 5, 1967, in the name of Frederick C. Carroll. The improvement resides in moving the focal length changing means disclosed in such application automatically, and in the structure for accomplishing such result.

The objects of this invention are to improve projected indication weighing scales and to provide a projection system for such scales in which any one of several surfaces of chart data arranged in spaced relation from each other is projected onto a display screen even though the system's projection lens has a fixed distance from such surfaces of chart data, the selection of chart surfaces being accomplished automatically and by novel structure.

The above and other objects and features of this invention will be appreciated more fully from the following detailed description when read with reference to the accompanying drawings wherein:

FIG. 1 is a perspective view of a projected indication computing weighing scale;

FIG. 2 is a perspective view of the upper part of the weighing scale with its housing removed to reveal details;

FIG. 3 is a plan view of part of the weighing scale's projection system showing a carriage and a projection lens carried thereby;

FIG. 5 is a schematic diagram of a load-responsive chart, projected images of which can be seen on the display screen shown in FIG. 1; and FIG. 6 is a schematic diagram of a projection system.

Figure 4:
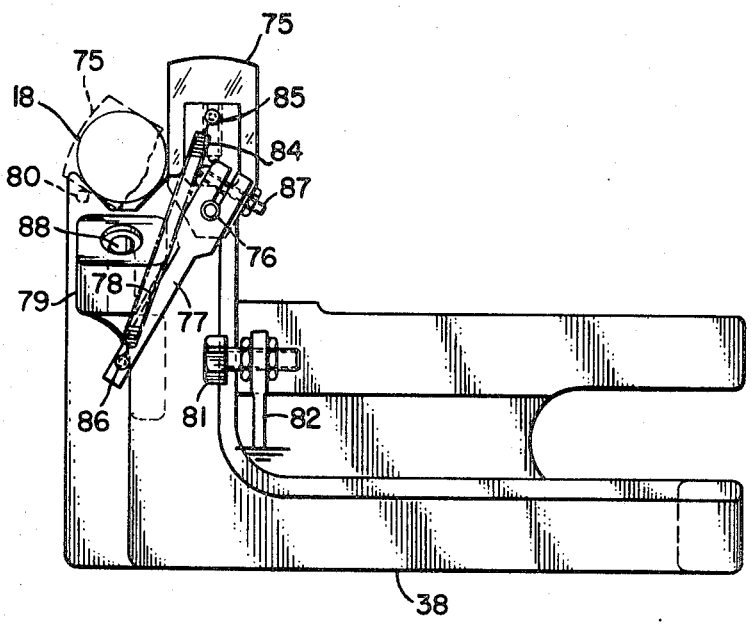
FIG. 4 is a fragmentary rear elevational view as seen from the line 4—4 of FIG. 3.

Referring to the drawings, the force of gravity acting on a load placed on a load receiver or platter 10 is transmitted to a lever, as shown in U.S. Pat. No. 3,074,496, issued Jan. 22, 1963, in the name of Lawrence S. Williams, of a projected indication weighing scale 11, such lever carrying a chart 12 which accordingly is load responsive.

The chart 12 preferably is of transparent glass and includes two surfaces of data 13 and 14 arranged in spaced relation from each other and sandwiched between transparent plates of material 15, 16 and 17. The plates may be glass, plastics, or any suitable transparent material and serve to keep the data surfaces 13 and 14 clean and to space them apart.

The data surface 13 includes the data shown in FIG. 5 with respect to unit price and computed value of produce to be weighed on the scale.

The data surface 14 includes data similar to the data of surface 13 but with respect to unit price and computed value of meat to be weighed on the scale.

Weight data is carried on surface 14a (FIG. 3) of the chart 12. A projection lens 19 always is focused on the weight data; this part of the optical system does not enter into the invention.

Enlarged images of the chart indicia are projected by means of a projection system onto a display screen 17a. The projection system includes two projection lenses, one 19 for weight projection and one 18 for unit price and computed value projection, the unit price and computed value projection lens 18 being movable along the chart 12 to select computed value columns in accordance with selected unit price by turning a price selector knob 20.

The optical system includes an optical frame 21 which is pivotally mounted like a cradle by means including three flexure ribbons 22, two of which are shown in FIG. 3. A slide rail 23 is carried by the optical frame 21 closely adjacent and parallel to the chart 12. The left-hand end of the slide rail 23 as viewed in FIG. 3 is pivotally attached to an ear 24 of the optical frame which has a V-notched bearing surface 25 that cooperates with a cylindrical surface 26 of the slide rail. A screw 27 holds the surfaces 25 and 26 together. The right-hand end of the slide rail 23 is adjustably attached to an ear 28 of the optical frame by a stud 29 that is threaded into the ear 28 and extends through an oversize opening in the slide rail in a sloppy fit. Lock nuts 30 threaded on the stud 29 against each side of the slide rail 23 are provided to hold the side rail in a position on the stud which is adjustable along the axis of the stud.

The optical system is divided into a weight projection subassembly 31 stationarily mounted on the right-hand end of the optical frame 21 as viewed in FIG. 3 and a unit price and computed value projection subassembly 32 shiftably mounted on the left-hand end of the slide rail 23. The weight projection subassembly 31 includes a generally U-shaped bracket 33 fixedly attached by screws 34 to the optical frame 21 adjacent the ear 28 on the frame, the legs of the U straddling an end of the chart 12, on which bracket 33 the projection lens 19 is mounted at one side of the chart 12 and a first mirror 35, a condensing lens 36 and a second mirror 37 are mounted at the other side of the chart.

The unit price and computed value projection subassembly 32 includes a generally U-shaped reciprocable carriage 38 slidable on the slide rail 23, the legs of the U straddling an end of the chart 12. The projection lens 18 is mounted on the carriage 38 at one side of the chart 12 and a condensing lens 39 and a mirror 40 are mounted on the carriage at the other side of the chart. A stationary mirror 41 is mounted on the optical frame 21 adjacent the ear 24 on the frame.

The carriage 38 is selectively shiftable on the slide rail 23 in a path parallel to the chart 12 as indicated by the double-ended arrow in FIG. 3 by means of a cord drive. The cord drive includes a cord 42 which runs over a pair of idlers 43, one of which is shown in FIG. 2, mounted on brackets 44 attached to the frame 45 of the weighing scale, around a spool 46 to which the ends of the cord are attached forming an endless cord, over an idler (not shown), and over a pair of pulleys 47 mounted one on each end of the slide rail 23. The cord 42 is fixedly clamped to the carriage 38 as shown in the above U.S. Pat. No. 3,074,496. The carriage 38 may be shifted back or forth on the slide rail 23 by turning the price selector knob 20 fixedly attached to the end of a shaft 48 exteriorly of the scale housing 49 which turns the spool 46 and drives the cord 42 in the selected direction. The spool 46 has two grooves 50 one of which receives one end of the cord 42 and the other of which receives the other end of the cord 42, such cord ends extending through radially extending holes in the spools to be caught under the heads of screws shown in U.S. Pat. No. 3,279,551, issued Oct. 18, 1966, in the name of T. W. Gittus to secure the cord ends to the spool. The shaft 48 is rotatably mounted in a U-shaped bracket 51 atop a post 52 erected from a shelf 53 of the frame 45 and has an end which extends beyond such bracket 51 to be rotatably mounted in a bracket 54 atop a post 55 also erected from the shelf 53.

A light beam 56 projecting images of weight indicia emanating from a source 74 (FIG. 6) is turned horizontally and parallel to the chart 12 by the mirror 35. The beam 56 then passes through the condensing lens 36 to the mirror 37 which turns it through 90° and causes the beam to travel in the proper direction to pass through a weight column 57 (FIG. 5) of the chart 12 and through the projection lens 19 to a mirror 58. The beam then travels to a mirror 59 (FIG. 2) which reflects it to the display screen 17a having a frosted front surface with an index or zero line 60 thereon.

A second light beam 61 projecting images of unit price and/or computed value indicia emanates from the same light source 74 and is turned by the mirror 41 horizontally and parallel to the chart 12. The beam 61 then passes through the condensing lens 39 to the mirror 40 which turns it through 90° and causes the beam to travel in the proper direction to pass through price range 62 and/or value 73 columns (FIG. 5) of the chart 12 and through the projection lens 18 to a mirror 64 attached to the carriage 38. The mirror 64 turns the beam upwardly so that it travels to the mirror 59 (FIG. 2) which reflects the beam onto the display screen 13. A vertical baffle 65 (FIG. 2) prevents possible interference between the several light beams. The mirror 59 is mounted in a frame 66 atop two posts 67 erected from the frame 45 and the display screen 17a is mounted in a frame 68 atop two posts 69 erected from the frame 45.

The weight 57, unit price 62 and computed value 73 columns of the chart 12 are shown schematically in FIG. 5 and are shown as they actually appear in their projected form in Weight and Value windows which are located in front of the display screen in FIG. 1. In operation, the image of the particular unit price displayed along with the image of part of its computed value column depends on the position of the selectively shiftable carriage 38 which carries the projection lens 18 along the slide rail 23. As shown in FIG. 1, the unit price 99 appears in the Value window representing a price of 99 cents per pound of a commodity to be weighed. The operator selects the desired unit price when the scale is at zero by turning the price selector knob 20 which reciprocates the carriage 38 along the slide rail 23 to direct the beam projecting images of unit price and/or computed value indicia through a selected value column 73 of indicia until the image of the selected unit price indicium appears in the Value window. After selecting the price, the commodity to be weighed is placed upon the platter 10 (FIG. 1) and the chart 12 moves downward until the weight of the commodity is indicated in the Weight window and the value of such commodity computed according to the selected price is indicated in the Value window. Such downward movement of the chart 12 moves the price range 62 on the chart out of the field of view of the projection lens 19 so that prices are no longer displayed on the screen 17a. Adjacent the knob 20 is located a switch knob 70 for turning the light source for the optical systems on and off and a pivotable cover 72 behind which is a screw 71 that is used to effect a zero adjustment (zero adjustment described in the above U.S. Pat. No. 3,074, 496).

The chart data surface 13 which includes the successive series of indicia shown in FIG. 5 with respect to unit price and computed value of produce has indicia of relatively low value. The chart data surface 14 which also includes similar successive series of indicia relating to meat has indicia of relatively high value. Retail weighing scales customarily have been sold in two models one with a produce chart and the other with a meat chart, the prices of produce and meat being so different as to require two charts. Using the arrangement shown in FIG. 6, the respective produce and meat successive series of indicia are on two flat surfaces (can be curved) arranged in spaced relation from each other. A transparent focal length changing means 75 is removed or inserted in the optical path between the projection lens 18 and the chart or is moved in such an optical path to vary the thickness of the focal length changing means in such path to focus the projection lens on only one of such data surfaces at any one time. That is, the effective focal length of the projection system is varied, whereby the focusing is accomplished. The focal length changing means can be located anywhere between the projection lens and the chart, can be of any convenient size, and can even be tilted a bit and yet produces satisfactory results.

The weighing scale shown in FIG. 1 has an optical system similar to the one disclosed in the above U.S. application Ser. No. 651,235. In the commercial scale, the projection lens 18 has a focal length of about 0.5, the distance from the surface of chart data 13 to the center of the projection lens is about 0.5 inch and the distance from the center of the projection lens to the display screen 17a is about 20 inches. This arrangement produces a magnification of about forty, i.e., the above 20 inches divided by the above 0.5 inch. The thickness of each of the plates 15–17 is about 0.0625 inch.

It has been found experimentally that when a transparent focal length changer 75 of about 0.125 inch thick and having a refractive index of about 1.5 is inserted in the optical path between the projection lens 18 and the chart 12 the insertion focuses the projection lens on the data surface 14. When the focal length changer 75 is removed from the optical path, the projection lens is focused on the data surface 13. Images of only that particular data surface on which the projection lens is focused are seen on the display screen 17a, at least as a practical matter.

The projection system with the focal length changer 75 removed from the optical path is a thin lens system having object and image distances as shown on page 47 of "Fundamentals of Optics" by F. A. Jenkins and H. E. White and published by McGraw-Hill Book Company, Inc. in 1957 (third edition). The projection system with the focal length changer 75 inserted in the optical path is a thin lens combination or thick lens system. As shown on page 52 in the foregoing book, the addition of a second lens between the first lens and the first lens' image changes the final image distance. Similarly, the addition of the focal length changer 75 between the projection lens 18 and the chart 12 changes the object distance.

Light pasisng from the condenser 39 through the chart 12 and the focal length changer 75 is refracted according to the law of refraction or Snell's law. In order to state a more general principle which includes the laws of reflection and refraction, it is convenient to consider the definition of the optical path. When light travels a distance $d$ in a medium of refractive index $n$, the optical path is the product $nd$. The distance between the center of the projection lens 18 and the plane of data 13 as mentioned above is about 0.5 inch. Ignoring the fact that 0.0625 inch of this distance is glass (plate 15), we can say that the optical path, $nd$, is the refractive index of air times 0.5 inch. With the focal length changer 75 removed from the optical path, the projection lens 18 is focused on data surface 13.

When the focal length changer 75 (0.125 inch) is inserted in the optical path, 0.125 inch of air is removed leaving 0.375 inch of air (0.5 inch less 0.125 inch). However the 0.125 inch thickness of the focal length changer 75 (refractive index 1.5) is added, adding 0.1875 inch of effective air (0.125 times the refractive index 1.5). Adding the 0.375 inch of actual air to the 0.1875 inch of effective air produces an object distance of 0.5625 inch which is the physical distance between the center of the projection lens and data surface 14 to prove mathematically the experimental results. In other words, the optical path, $nd$, which was the refractive index of air times 0.5 inch with the focal length changer 75 out of the path becomes greater when part of the air is substituted by the focal length changer 75 of greater refractive index. Hence, the effective optical path length between the projection lens and the chart is varied by varying the thickness of the focal length changer 75 in the path from zero to 0.125 inch or vice versa, whereby the focusing of the projection lens 18 on one or the other of the data surfaces 13 and 14 is accomplished.

Instead of describing the change in object distance being due to a change in the effective optical path length to selectively focus the projection lens on one of the two data surfaces, the selective focusing can be said to be due to changing the effective focal length of the projection system. The focal length of the thin lens system is 0.5 as mentioned above. However, changing to a thick lens system by the insertion of the focal length changer 75 increases the effective focal length of the lens system as indicated by the increase in the object distance.

The focal length changer 75 is moved automatically on arrival of the projection lens 18 at either end of the carriage path whereby focusing of the projection lens 18 on the proper one of the data surfaces 13 and 14 is accomplished automatically. The changer 75 is fixed on a shaft 76 which is pivotally mounted in the carriage 38. A bifurcated end of a lever 77 embraces the end of the shaft 76 remote from the changer 75 and is movable between limits defined by a surface 78 of an abutment 79 on the carriage 38 and a stop pin 80 carried by the carriage 38. A screw 87 keeps the bifurcated end of the lever 77 tight on the shaft 76. In the solid line position of the changer 75 shown in FIG. 4, the lever 77 is against the stop surface 78 of the abutment 79 and in the broken line position of the changer 75 shown in FIG. 4 the changer 75 abuts the stop pin 80 (FIGS. 3 and 4). In the solid line position of the changer 75 shown in FIG. 4, the changer 75 is out of the optical path as shown in FIGS. 3 and 6 and in the broken line position of the changer 75 shown in FIG. 4, the changer 75 is in the optical path. As described above, when the changer 75 is out of the optical path, the projection lens 18 is focused on data surface 13 and, when the changer 75 is in the optical path, the projection lens 18 is focused on data surface 14.

Movement of the carriage 38 to the left as viewed in FIG. 3 to the one end of its path carries the lever 77 into contact with an adjustable stop screw 81 (FIG. 4) carried on an arm 82 rising from the base of the scale and movement of the carriage 38 to the right as viewed in FIG. 3 to the other end of its path carries the lever 77 into contact with an adjustable stop screw 83 (FIG. 3) carried on the frame 21 (FIG. 3). An over-center toggle spring 84 connected being a coil anchor pin 85 extending from the carriage 38 and a pin-like extension 86 on the bottom of the lever 77 retains the lever 77 and, thus, the changer 75 in one or the other of its positions.

The abutment 79 defines a hole 88 which receives a pin (not shown) on the mirror 64 (FIG. 3) to mount it. The mirror 64 is removed from the carriage 38 as shown in FIG. 4 to reveal the movable parts. Also, the means for holding the projection lens 18 on the carriage 38 is not shown in FIG. 4.

In operation, the operator selects the desired unit price when the scale is at zero weight by turning the price selector knob 20 which reciprocates the carriage and directs the beam projecting images of unit price and computed value indicia until the image of the selected unit price indicium appears in the Value window (FIG. 1). With reference to FIG. 5, if the scale is on low range, i.e., projection lens 18 focused on produce data surface 13 by the focal length changer 75 being removed from the optical path, movement of the projection lens 18 between the limits defined by the double-ended arrow indicating the extent of "Value Columns 73" selects the low range unit prices and their respective columns of low range computed values. This is the solid line position of the changer 75 shown in FIG. 4 with the lever 77 against the abutment 79.

Movement of the carriage 38 to the right as seen in FIG. 5, carries the projection lens 18 beyond the value columns 73 and the operator sees nothing in the Value window (FIG. 1) except "HIGH RANGE" as shown in FIG. 5. In the "HIGH RANGE" position, the carriage 38 has moved the lower end of the lever 77 against the stop screw 83 (FIG. 3) to a position where the over-center toggle spring 84 takes over and moves the lever 77 as far as the stop pin 80 permits; the focal length changing means 75 now is in the optical path focusing the projection lens 18 on meat data surface 14. Movement of the projection lens 18 to the left after the focus change as viewed in FIG. 5 between the limits defined by the double-ended arrow indicating the extent of "Value Column 73" selects the high range unit prices and their respective columns of high range computed values.

Movement of the carriage 38 to the left as seen in FIG. 5, carries the projection lens 18 beyond the value columns 73 and the operator sees nothing in the Value window except "LOW RANGE." In the "LOW RANGE" position, the carriage 38 has moved the lower end of the lever 77 against the stop screw 81 (FIG. 4) to a position where the over-center toggle spring 84 takes over and moves the lever 77 as far as the abutment 79 permits; the focal length changing means 75 now is removed from the optical path focusing the projection lens 18 on produce data surface 13. Movement of the projection lens 18 to the right after the focus change as viewed in FIG. 5 between the limits defined by the double-ended arrow indicating the extent of the "Value Column 73" selects the low range unit prices and their respective column of low range computed values.

The weighing scale includes the display screen 17a and means for projecting images onto the screen including the load-responsive chart 12 having succesive series of indicia on two surfaces 13 and 14 arranged in spaced relation from each other, a carriage 38 movable along the chart, and lens means. The lens means includes the projection lens 18 carried by the carriage for projecting images from each of the series to the screen. The projection lens has a fixed distance from the chart and is focused on one of the indicia surfaces during travel of the carriage in one direction and on the other one of the indicia surfaces during travel in the opposite direction. The lens means also includes the movable focal length changing means 75 for changing the effective optical path length between the projection lens and the chart by varying the thickness of the focal length changing means in the optical path. The over-center means, i.e., lever 77, spring 84, and their adjuncts, is operable when engaged by one or the other of the stop screws 81 and 83 on arrival of the projection lens 18 at either end of the carriage path to automatically move the focal length changing means, whereby the focusing is accomplished.

The "HIGH RANGE" and "LOW RANGE" lengends (FIG. 5) on the chart 12 are means for indicating, when the projection lens is at either end of its carriage path, in which direction the projection lens should be moved for further operation of the scale.

It is to be understood that the above description is illustrative of this invention and that various modifications thereof can be utilized without departing from its spirit and scope.

Having described the invention, I claim:

1. A projected indication weighing scale comprising, in combination, a display screen, means for projecting images onto the screen including a transparent load-responsive chart having successive series of indicia on a plurality of surfaces arranged in spaced relation from each other, a carriage movable along the chart and lens means, the lens means including a projection lens carried by the carriage in a carriage path for projecting images of the indicia from each of the series onto the screen and having a fixed distance from the chart for focusing on one of the indicia surfaces, the indicia surfaces being spaced axially in the optical path, the lens means further including focal length changing means insertable or removable in the optical path between the projection lens and the chart for changing the effective optical path length between the projection lens and the chart to focus the projection lens on only one of the indicia surfaces at any one time, and means operable on arrival of the projection lens at either end of the carriage path for automatically moving the focal length changing means whereby said focusing is accomplished.

2. A projected indication weighing scale in accordance with claim 1 having means for indicating, when the projection lens is at either end of its carriage path, in which direction the projection lens should be moved for operation of the scale.

3. A projected indication weighing scale in accordance with claim 1 wherein the focal length changing means is carried by the carriage.

4. A projected indication weighing scale in accordance with claim 3 wherein over-center means connects the focal length changing means to the carriage and stop means at the ends of the carriage path move the focal length changing means to accomplish the focusing automatically.

5. A projected indication weighing scale comprising, in combination, a display screen, means for projecting images onto the screen including a transparent load-responsive chart having successive series of indicia on a plurality of surfaces arranged in spaced relation from each other, a carriage movable along the chart and lens means, the lens means including a projection lens carried by the carriage in a carriage path for projecting images of the indicia from each of the series onto the screen and having a fixed distance from the chart for focusing on one of the indicia surfaces, the indicia surfaces being spaced axially in the optical path, the lens means further including focal length changing means carried by the carriage and insertable or removable in the optical path between the projection lens and the chart for changing the effective optical path length between the projection lens and the chart to focus the projection lens on only one of the indicia surfaces at any one time, manually operable means for driving the carriage and the focal length changing means in the carriage path, and stop means at the ends of the carriage path against which the movable focal length changing means is driven for moving the focal length changing means on arrival of the carriage at either end of the carriage path in accordance with the indicia surface to be focused on and thus accomplish focusing automatically.

6. A projected indication weighing scale in accordance with claim 5 wherein over-center means connects the focal length changing means to the carriage.

7. A projected indication weighing scale comprising, in combination, a display screen, means for projecting images onto the screen including a transparent load-responsive chart having successive series of indicia on a plurality of surfaces arranged in spaced relation from each other, a carriage movable along the chart and lens means, the lens means including a projection lens carried by the carriage in a carriage path for projecting images of the indicia from each of the series onto the screen and having a fixed distance from the chart for focusing on one of the indicia surfaces, the indicia surfaces being spaced axially in the optical path, the lens means further including focal length changing means carried by the carriage and insertable or removable in the optical path between the projection lens and the chart for changing the effective optical path length between the projection lens and the chart to focus the projection lens on only one of the indicia surfaces at any one time, manually operable means for driving the carriage in the carriage path, and means for moving automatically the movable focal length changing means on arrival of the carriage at either end of the carriage path in accordance with the indicia surface to be focused on.

8. A projected indication weighing scale in accordance with claim 7 wherein over-center means connects the focal length changing means to the carriage.

References Cited

UNITED STATES PATENTS

| 2,554,679 | 5/1951 | Mitchell | 352—140 |
|---|---|---|---|
| 3,074,496 | 1/1963 | Williams | 177—178 |
| 3,279,551 | 10/1966 | Gittus | 177—178 |
| 3,477,781 | 11/1969 | Six | 353—25X |

HARRY N. HAROIAN, Primary Examiner

U.S. Cl. X.R.

353—78, 101; 177—178